United States Patent
Xue et al.

(10) Patent No.: US 8,447,877 B2
(45) Date of Patent: *May 21, 2013

(54) ALWAYS-ON WIRELESS INTERNET PROTOCOL COMMUNICATION

(75) Inventors: Hao Xue, Ottawa (CA); William Daniel Willey, San Francisco, CA (US); M. Khaledul Islam, Kanata (CA); Shahid Chaudry, Ottawa (CA)

(73) Assignee: Research In Motion Limited, Waterloo (CA)

( * ) Notice: Subject to any disclaimer, the term of this patent is extended or adjusted under 35 U.S.C. 154(b) by 292 days.

This patent is subject to a terminal disclaimer.

(21) Appl. No.: 13/025,640

(22) Filed: Feb. 11, 2011

(65) Prior Publication Data

US 2011/0134784 A1 Jun. 9, 2011

Related U.S. Application Data

(63) Continuation of application No. 12/171,939, filed on Jul. 11, 2008, now Pat. No. 7,912,977, which is a continuation of application No. 10/523,360, filed as application No. PCT/CA03/01160 on Jul. 31, 2003, now Pat. No. 7,437,403.

(60) Provisional application No. 60/400,865, filed on Aug. 1, 2002.

(51) Int. Cl.
*G06F 15/16* (2006.01)
*H04B 7/00* (2006.01)
*G08C 17/00* (2006.01)

(52) U.S. Cl.
USPC ............................ 709/232; 370/310; 370/311

(58) Field of Classification Search
USPC .................................. 709/232; 370/310, 311
See application file for complete search history.

(56) References Cited

U.S. PATENT DOCUMENTS

| 5,708,656 A | 1/1998 | Noneman et al. |
| 6,424,639 B1 | 7/2002 | Lioy et al. |

(Continued)

FOREIGN PATENT DOCUMENTS

| CA | 2359508 A1 | 5/2002 |
| EP | 1047239 A2 | 10/2000 |

(Continued)

OTHER PUBLICATIONS

Official Action issued for Japanese Patent Appln. No. 2009-251521 on Jul. 15, 2011 (mailed Jul. 27, 2011), 2 pages.

(Continued)

*Primary Examiner* — Ario Etienne
*Assistant Examiner* — Hee Soo Kim
(74) *Attorney, Agent, or Firm* — Jones Day

(57) ABSTRACT

In accordance with the teachings described herein, systems and methods are provided for always-on wireless IP communication. An access provider network (APN) that includes an always-on packet data serving node (PDSN) may be used to communicate over a wireless communication link with a mobile station. The PDSN may include an inactivity timer and may be used to set the inactivity timer to an inactivity timer starting value and send a starting value estimate to the mobile station over the wireless communication link, wherein the starting value estimate is a function of the inactivity timer starting value. The mobile station may include an inactivity timer estimate and may be used to receive the starting value estimate and set the inactivity timer estimate to the starting value estimate. The mobile station may also be used to reset the inactivity timer estimate to the starting value estimate when the mobile station communicates with the APN.

29 Claims, 8 Drawing Sheets

U.S. PATENT DOCUMENTS

| | | |
|---|---|---|
| 6,487,218 B1 | 11/2002 | Ludwig et al. |
| 6,907,016 B2 | 6/2005 | Madour et al. |
| 6,912,214 B2 | 6/2005 | Madour et al. |
| 6,947,416 B1 | 9/2005 | Nee et al. |
| 7,043,249 B2 | 5/2006 | Sayeedi |
| 7,054,291 B2 | 5/2006 | Balazinski et al. |
| 7,065,062 B2 | 6/2006 | Madour et al. |
| 7,126,924 B2 | 10/2006 | Suzuki et al. |
| 7,139,829 B2 | 11/2006 | Wenzel et al. |
| 7,154,903 B2 | 12/2006 | Sivalingham |
| 2001/0018342 A1 | 8/2001 | Vialen et al. |
| 2002/0055364 A1 | 5/2002 | Wang et al. |
| 2002/0068570 A1 | 6/2002 | Abrol et al. |
| 2002/0075823 A1 | 6/2002 | Lee et al. |
| 2002/0172178 A1 | 11/2002 | Suzuki et al. |
| 2002/0186696 A1 | 12/2002 | Lim |
| 2003/0149772 A1 | 8/2003 | Hsu et al. |
| 2004/0203780 A1 | 10/2004 | Julka et al. |

FOREIGN PATENT DOCUMENTS

| | | |
|---|---|---|
| EP | 1148749 A2 | 10/2001 |
| EP | 1 193 924 B1 | 6/2005 |
| JP | 63-46046 | 2/1988 |
| JP | 9-55764 | 2/1997 |
| JP | 10-28185 | 1/1998 |
| JP | 2000-261372 | 9/2000 |
| JP | 2000-261528 | 9/2000 |
| JP | 2000-307650 | 11/2000 |
| JP | 2002-10341 | 1/2002 |
| JP | 2002-111684 | 4/2002 |
| JP | 2002-199429 | 7/2002 |
| JP | 2002-209277 | 7/2002 |
| WO | 01/08359 A1 | 2/2001 |
| WO | 01/67786 A2 | 9/2001 |

OTHER PUBLICATIONS

Translation of Official Action (Notice of Reasons for Rejection) issued for Japanese Patent Appln. No. 2009-251521 on Jul. 15, 2011 (mailed Jul. 27, 2011), 3 pages.

Patent Abstracts of Japan, Publication No. 63-46046 dated Feb. 26, 1988, one page.

Translation of Notice of Reasons for Rejection dated Feb. 15, 2007 for Japanese Patent Application 2004-525095.

Translation of Notice of Final Rejection dated Aug. 31, 2007 for Japanese Patent Application 2004-525095.

Halabi, "Internet Routing Architectures," Pierson Education, Apr. 20, 1998, 101-106.

3rd Generation Partnership Project 2: "Wireless IP Network Standard," 3GPP2 P.S0001-B, Version 1.0.0, Oct. 25, 2002.

3rd Generation Partnership Project 2: "Interoperability Specification (IOS) for cdma2000 Access Network Interfaces—Part 1 Overview," (3G-IOS v4.3) (SDO Ballot Version), 3GPP2 A.S0011-A, Version 1.0, Oct. 2002.

3rd Generation Partnership Project 2: "Interoperability Specification (IOS) for cdma2000 Access Network Interfaces—Part 2 Transport," (3G-IOS v4.3) (SDO Ballot Version), 3GPP2 A.S0012-A, Version 1.0, Oct. 2002.

3rd Generation Partnership Project 2: "Interoperability Specification (IOS) for cdma2000 Access Network Interfaces—Part 3 Features," (3G-IOS v4.3) (SDO Ballot Version), 3GPP2 A.S0013-A, Version 1.0, Oct. 2002.

3rd Generation Partnership Project 2: "Interoperability Specification (IOS) for cdma2000 Access Network Interfaces—Part 7 (A10 and All Interfaces)," (3G-IOS v4.3) (SDO Ballot Version), 3GPP2 A.S0017-A, Version 1.0, Oct. 2002.

3rd Generation Partnership Project 2: "Interoperability Specification (IOS) for cdma2000 Access Network Interfaces—Part 5 (A3 and A7 Interfaces)," (3G-IOS v4.3) (SDO Ballot Version), 3GPP2 A.S0015-A, Version 1.0, Oct. 2002.

Simpson, W.: "The Point-to-Point Protocol (PPP)," Network Working Group, RFC 1661, Daydreamer, STD 51, Jul. 1994.

"TR45 cdma2000 Wireless IP Network Standard," PN-3-4732-RV2 (to be published as TIA/EIA/IS-835-B).

3rd Generation Partnership Project 2: "Upper Layer (Layer 3) Signaling Standard for cdma2000 Spread Spectrum Systems," Release C, 3GPP2 C.S0005-C, Version 1.0, May 28, 2002.

3rd Generation Partnership Project 2: "Interoperability Specification (IOS) for cdma2000 Access Network Interfaces—Part 4 (A1, A2, and A5 Interfaces)," (3G-IOS v4.3) (SDO Ballot Version), 3GPP2 A.S0014-A, Version 1.0, Oct. 2002.

3rd Generation Partnership Project 2: "Introduction to cdma2000 Standards for Spread Spectrum Systems," Release C, 3GPP2 C.S0001-C, Version 1.0, May 28, 2002.

3rd Generation Partnership Project 2: "Interoperability Specification (IOS) for cdma2000 Access Network Interfaces—Part 6 (A8 and A9 Interfaces)," (3G-IOS v4.3) (SDO Ballot Version), 3GPP2 A.S0016-A, Version 1.0, Oct. 2002.

3rd Generation Partnership Project 2: "Physical Layer Standard for cdma2000 Spread Spectrum Systems," Release C, 3GPP2 C.S0002-C, Version 1.0, May 28, 2002.

3rd Generation Partnership Project 2: "Medium Access Control (MAC) Standard for cdma2000 Spread Spectrum Systems," Release C, 3GPP2 C.S0003-C, Version 1.0, May 28, 2002.

3rd Generation Partnership Project 2: "Signaling Link Access Control (LAC) Standard for cdma2000 Spread Spectrum Systems," Release C, 3GPP2 C.S0004-C, Version 1.0, May 28, 2002.

3rd Generation Partnership Project 2: "Data Service Options for Spread Spectrum Systems," 3GPP2 C.S0017-O, Version 5.0, Feb. 17, 2003.

Patent Abstracts of Japan, Publication No. 09-055764 dated Feb. 25, 1997, one page.

Patent Abstracts of Japan, Publication No. 10-028185 dated Jan. 27, 1998, one page.

Patent Abstracts of Japan, Publication No. 2000-307650 dated Nov. 2, 2000, one page.

Translation of Office Action (Notice of Reasons for Rejection) issued for Japanese Patent Appln. No. 2007-133535 on Aug. 20, 2009 (mailed Aug. 24, 2009), 3 pages.

3rd Generation Partnership Project 2: "Interoperability Specification (IOS) for cdma2000 Access Network Interfaces—Part 7 (A10 and A11 Interfaces)," (3G-IOS v4.3) (SDO Ballot Version), 3GPP2 A.S0017-A, Version 1.0, Oct. 2002.

JPO: Official Action (Inquiry) issued for Japanese Patent Appln. No. 2007-133535 on Sep. 15, 2011 (mailed Sep. 16, 2011), 3 pages.

Translation of Official Action (Inquiry) issued for Japanese Patent Appln. No. 2007-133535 on Sep. 15, 2011 (mailed Sep. 16, 2011), 4 pages.

ALWAYS-ON WIRELESS INTERNET PROTOCOL COMMUNICATION

CROSS-REFERENCE TO RELATED APPLICATION

This application is a continuation of U.S. patent application Ser. No. 12/171,939, filed on Jul. 11, 2008, which is a continuation of U.S. patent application Ser. No. 10/523,360, filed on Feb. 1, 2005, now U.S. Pat. No. 7,437,403, which claims priority from and is related to the following prior applications: "Always-On Wireless Internet Protocol Communication," International Application No. PCT/CA2003/001160, filed Jul. 31, 2003, which claims priority to "System and Method of Wireless Always-On Internet Communication," U.S. Provisional Application No. 60/400,865, filed Aug. 1, 2002. These prior applications, including the entirety of the written descriptions and drawing figures, are hereby incorporated into the present application by reference.

FIELD

The technology described in this patent document relates generally to the field of point-to-point communication techniques. More particularly, the patent document describes a system and method for always-on wireless internet protocol (IP) communication with a mobile station, such as a 2-way paging device, a cellular telephone, a laptop computer, or other type of wireless-enabled device.

BACKGROUND AND SUMMARY

Wireless IP networks are known in this field. One such wireless network is described in the "CDMA2000™ Wireless IP Network Standard," TIA/EIA/IS-835-B. The CDMA2000™ Wireless IP Network utilizes a link control protocol (LCP) to establish and configure the point-to-point protocol (PPP), which is described in Request for Comments (RFC) 1661. TIA/EIA/IS-835-B and RFC 1661 are incorporated into the present application by reference.

In accordance with the teachings described herein, systems and methods are provided for always-on wireless IP communication. An access provider network (APN) that includes an always-on packet data serving node (PDSN) may be used to communicate over a wireless communication link with a mobile station. The PDSN may include an inactivity timer and may be used to set the inactivity timer to an inactivity timer starting value and send a starting value estimate to the mobile station over the wireless communication link, wherein the starting value estimate is a function of the inactivity timer starting value. The mobile station may include an inactivity timer estimate and may be used to receive the starting value estimate and set the inactivity timer estimate to the starting value estimate. The mobile station may also be used to reset the inactivity timer estimate to the starting value estimate when the mobile station communicates with the APN.

DETAILED DESCRIPTION

Figure 1:
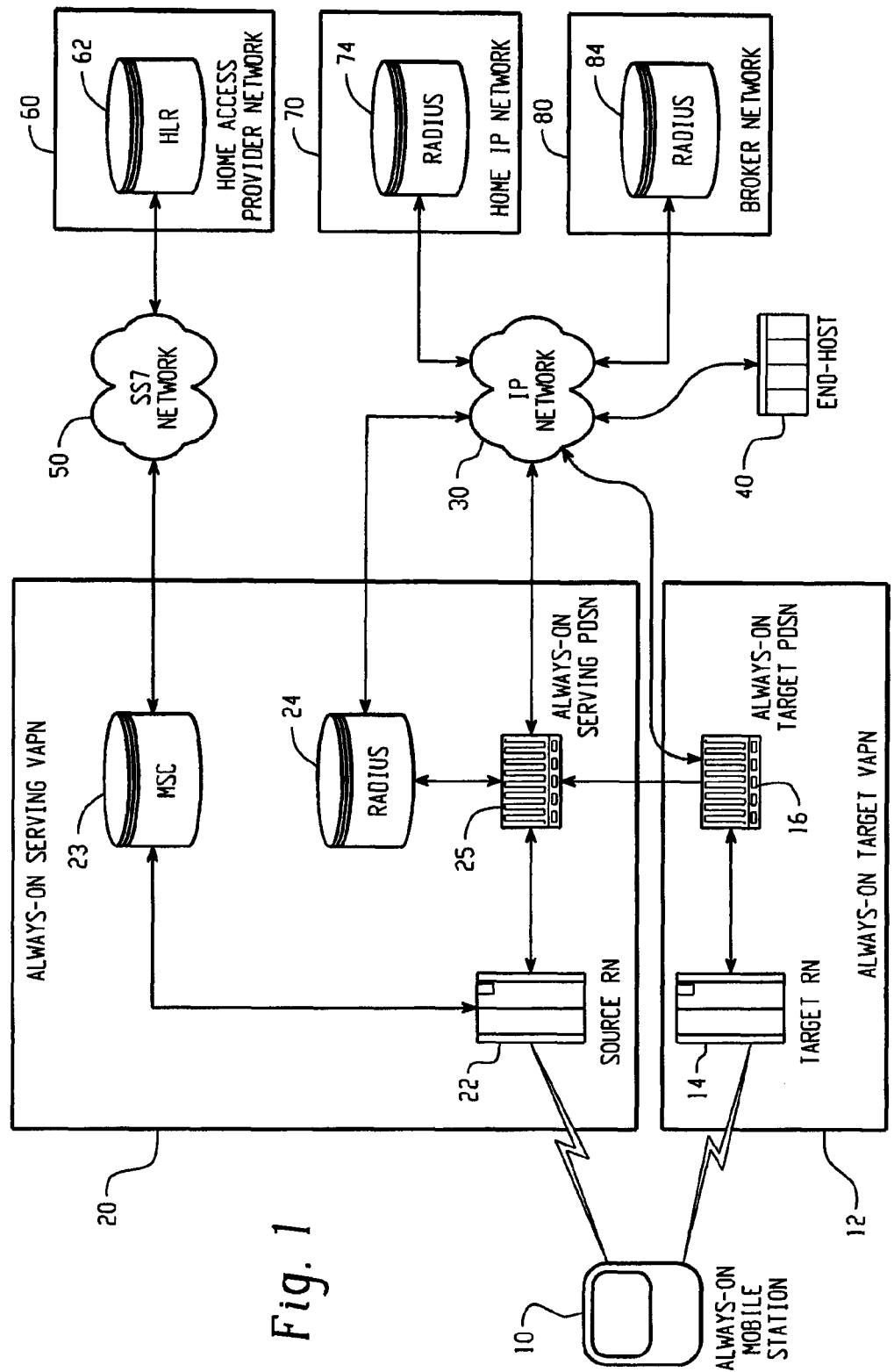
FIG. 1 shows an example wireless IP communication system that supports always-on communication with a mobile station.

With reference now to the drawing figures, FIG. 1 shows an example wireless IP communication system that supports always-on communication with a mobile station 10. The communication system includes an always-on target visited access provider network (VAPN) 12, an always-on serving VAPN 20, back-end network infrastructure 60, 70, 80, and an end host 40. Also included in the illustrated communication system are an IP network 30, such as the Internet, and a broadband telecommunications network 50, such as an SS7 network.

In operation, the always-on mobile station (MS) 10 communicates over the IP network 30 with the end host 40 via at least one always-on VAPN 12, 20 cooperating with back-end infrastructure 60, 70, 80. The mobile station 10 is always-on in the sense that a packet data session, such as a point-to-point protocol (PPP) session, may be maintained between the mobile station 10 and an always-on access provider network (APN) 12, 20, 60 while the mobile station 10 is dormant (e.g., does not have any data to send or receive). In addition, the PPP session may be maintained during periods when the mobile station 10 has moved out of coverage or is otherwise temporarily out of communication with the APN 12, 20, which may include periods when the mobile station 10 is being serviced by a network that does not support data communications.

The always-on target VAPN 12 includes a target radio network (RN) 14 and an always-on target packet data serving node (PDSN) 16. The always-on serving VAPN 20 includes a source radio network (RN) 22, an always-on serving PDSN 25, a remote authentication dial in service (RADIUS) server 24, and a mobile switching center (MSC) 23. Preferably, the mobile station 10 communicates with the always-on target VAPN 12, and is then handed-off to the always-on serving VAPN 20 for communication with the back-end infrastructure 60, 70, 80 and the end host 40. Alternatively, however, the mobile station 10 could communicate with back-end infrastructure directly via the always-on serving VAPN 20.

The always-on target PDSN 16 and/or the always-on serving PDSN 25 are configured to support always-on service for the mobile station 10. The always-on serving PDSN 25 preferably cooperates with the mobile station 10 via the always-on target PDSN 16. Alternatively, however, only one of the target PDSN 16 or the serving PDSN 25 may be an always-on PDSN. A detailed description of the always-on service, including descriptions of the always-on mobile station 10 and the always-on PDSN 16, 25, is provided below with reference to FIGS. 2-9.

The radio network (RN) 14, 22 may include a base station (s) to provide RF communication with the mobile station 12 and may also include a packet control function (PCF) to communicate with the always-on PDSN 16, 25. The communication link between the RN 14, 22 and the PDSN 16, 25 may be an R-P interface that uses a GRE tunnel to transport user packet data and signaling messages between the PCF and PDSN 16, 25. The communication link between the target PDSN 16 and the serving PDSN 25 may be a P-P interface to transport user data for a single service instance, and may be used to support a fast handoff function.

The RADIUS servers 24, 74, 84 located in the serving VAPN 20, home IP network 74 and broker network 84 are authentication, authorization and accounting (AAA) servers, such as those typically used in CDMA2000™ networks for providing AAA functionality. The home IP network 70 and home RADIUS server 74 provide IP based data services to the mobile station user, such as maintaining a network access identifier (NAI) for the mobile station 10. The broker network 80 and broker RADIUS server 84 is an intermediate network/server(s) that may be used to securely transfer RADIUS messages (e.g., AAA information) between the VAPN RADIUS server 24 and the home RADIUS server 74. It should be understood that more than one broker RADIUS server 84 may be used to transfer data between the VAPN RADIUS server 24 and the home RADIUS server 74.

The mobile switching center (MSC) 23 connects the source RN 22 with a home location register (HLR) 62 at a home access provider network (APN) 60. The home access provider network 60 is a wireless network that provides the home service area for the mobile station 10. It should be understood that the system illustrated in FIG. 1 shows an example operation of the always-on mobile station 12 while the mobile station 12 is outside of the coverage area of the home access provider network 62. However, the home access provider network 60 preferably includes similar components as the visited access provider network 12, 20, including a home radio network (RN) and a home always-on PDSN. Therefore, always-on service may also be available between the always-on mobile station 12 and the home always-on PDSN in the home APN 60.

The example wireless IP communication system illustrated in FIG. 1 may, for example, be a CDMA2000™ wireless IP network that is configured to provide always-on service, as described herein. Additional details regarding the operation of a typical CDMA2000™ wireless IP network may be found in the following standard documents (referred to herein as the "Standards"): TIA/EIA/IS-835-B, RFC 1661, TIA/EIA/IS-2000-1 (3GPP2 C.S0001), TIA/EIA/IS-2000-2 (3GPP2 C.S0002), TIA/EIA/IS-2000-3 (3GPP2 C.S0003), TIA/EIA/IS-2000-4 (3GPP2 C.S0004), TIA/EIA/IS-2000-5 (3GPP2 C.S0005), TIA/EIA/IS-707 (3GPP2 C.S0017), A.S0001, and their revisions, which are incorporated herein by reference.

Figure 2:
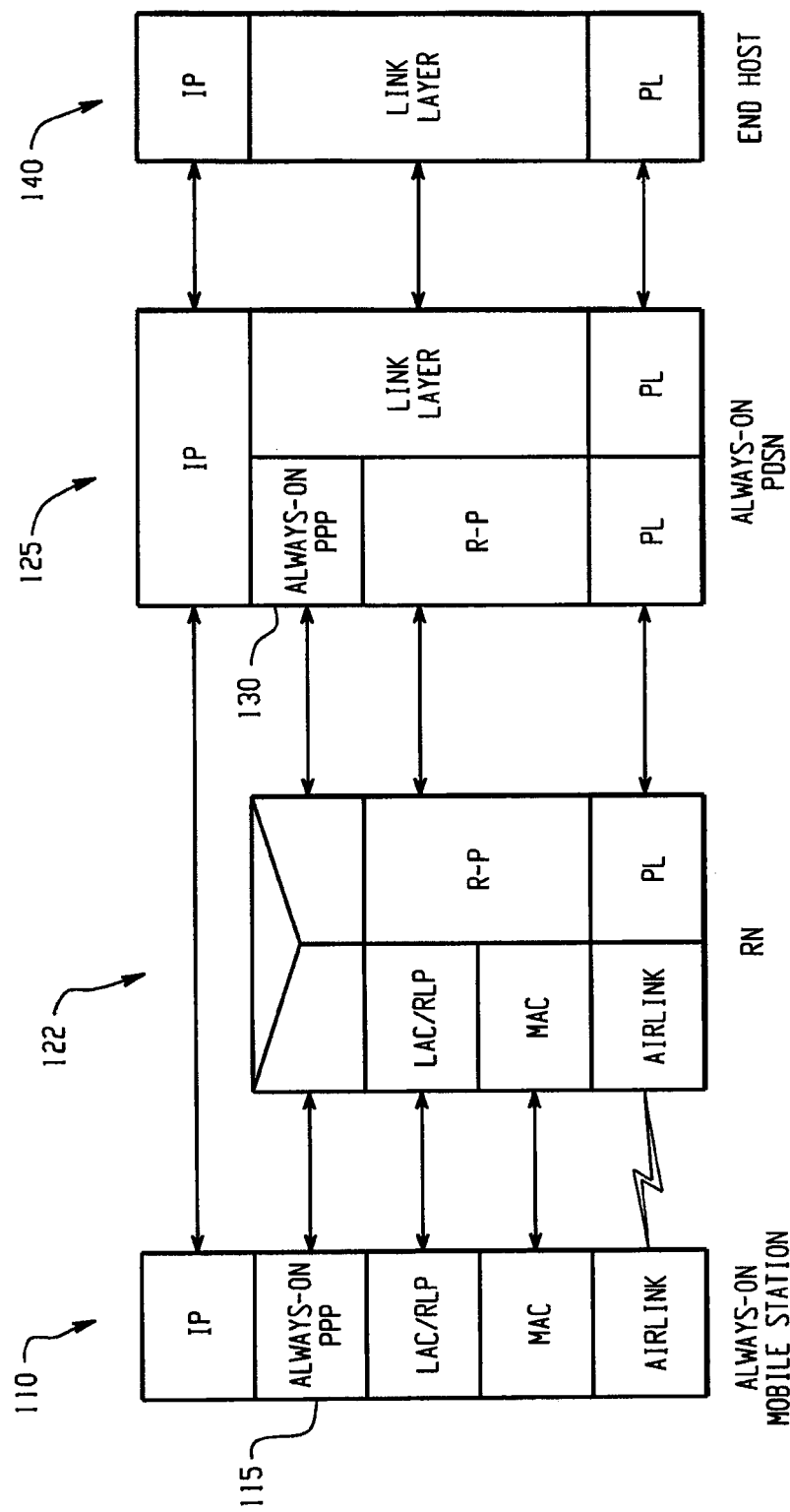
FIG. 2 shows example protocol stacks at various components of the system of FIG. 1.

FIG. 2 shows example protocol stacks 110, 122, 125, 140 at various components of the IP-based system of FIG. 1. Four protocol stacks 110, 122, 125 and 140 are illustrated, each corresponding respectively to the always-on mobile station (MS) 10, a radio network (RN) 14, 22, an always-on PDSN 16, 25 and the end host 40. Protocol stacks 110 and 125 each include always-on point-to-point protocol (PPP) layers 115 and 130. The always-on PPP layers 115 and 130 co-operate to maintain a PPP session, which enables IP communication between the mobile station 10 and the end host 40 despite out-of-coverage or similar situations at the mobile station 10. The operation of the always-on PPP layer 115 at the always-on mobile station 10 is described below with reference to FIG. 3, and the operation of the always-on PPP layer 135 at the always-on PDSN 16, 25 is described below with reference to FIGS. 4 and 5. The operation of the remaining protocol layers illustrated in FIG. 2 is within the knowledge of persons skilled in the art and is described in more detail in the Standards. The physical layer airlink between the always-on mobile station and RN is described in TIA/EIA/IS-2000-2. The MAC between the always-on mobile station and RN is described in TIA/EIA/IS-2000-3. The LAC between the always-on mobile station and RN is described in TIA/EIA/IS-2000-4. The Layer 3 signaling messages used for control of the physical layer are described in TIA/EIA/IS-2000-5. The Radio Link Protocol (RLP) between the always-on mobile station and RN is described in TIA/EIA/IS-707. The R-P protocol, also known as A10 and A11 is described in A.S0001.

Figure 3:
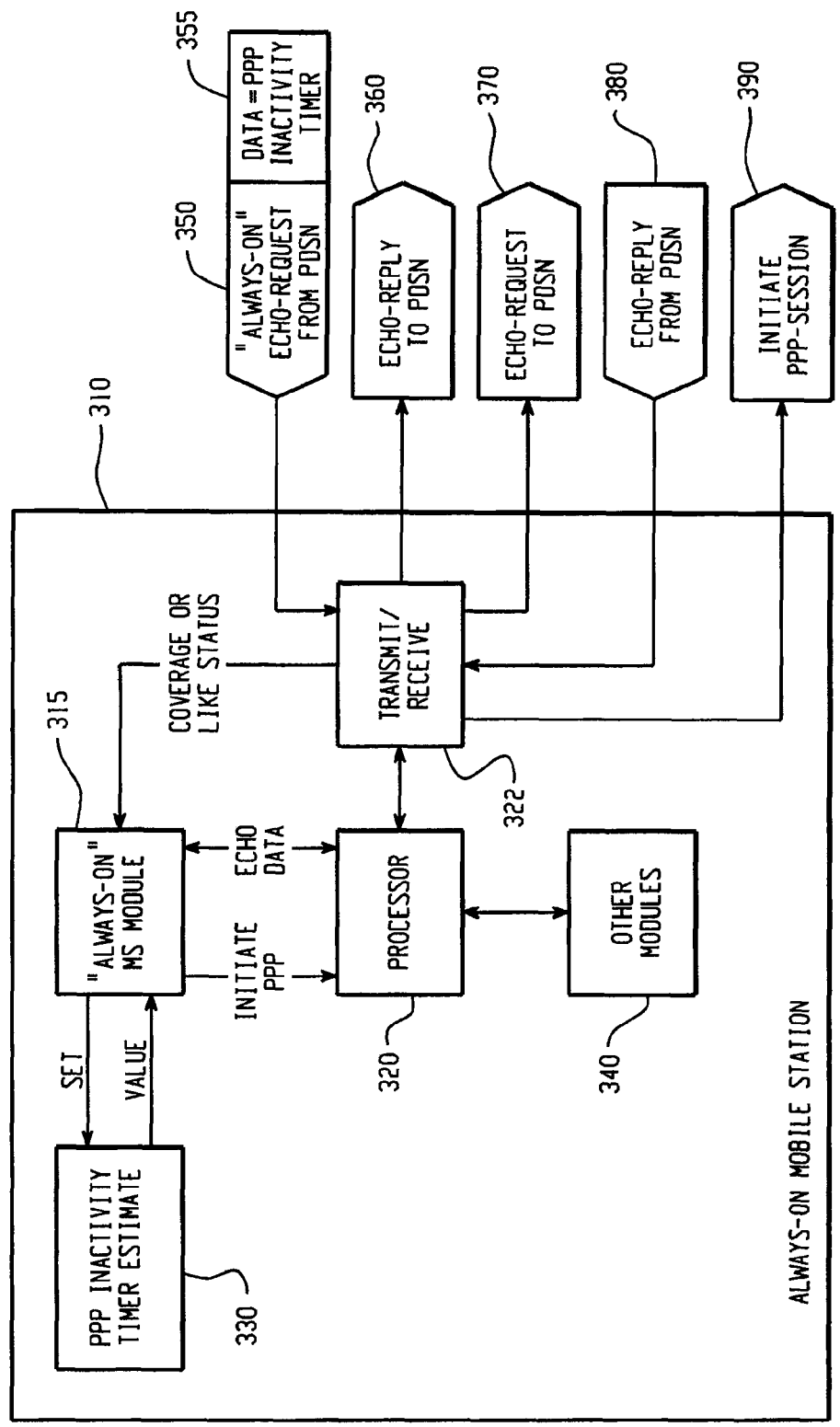
FIG. 3 shows a block diagram of an example always-on mobile station.
Figure 4:
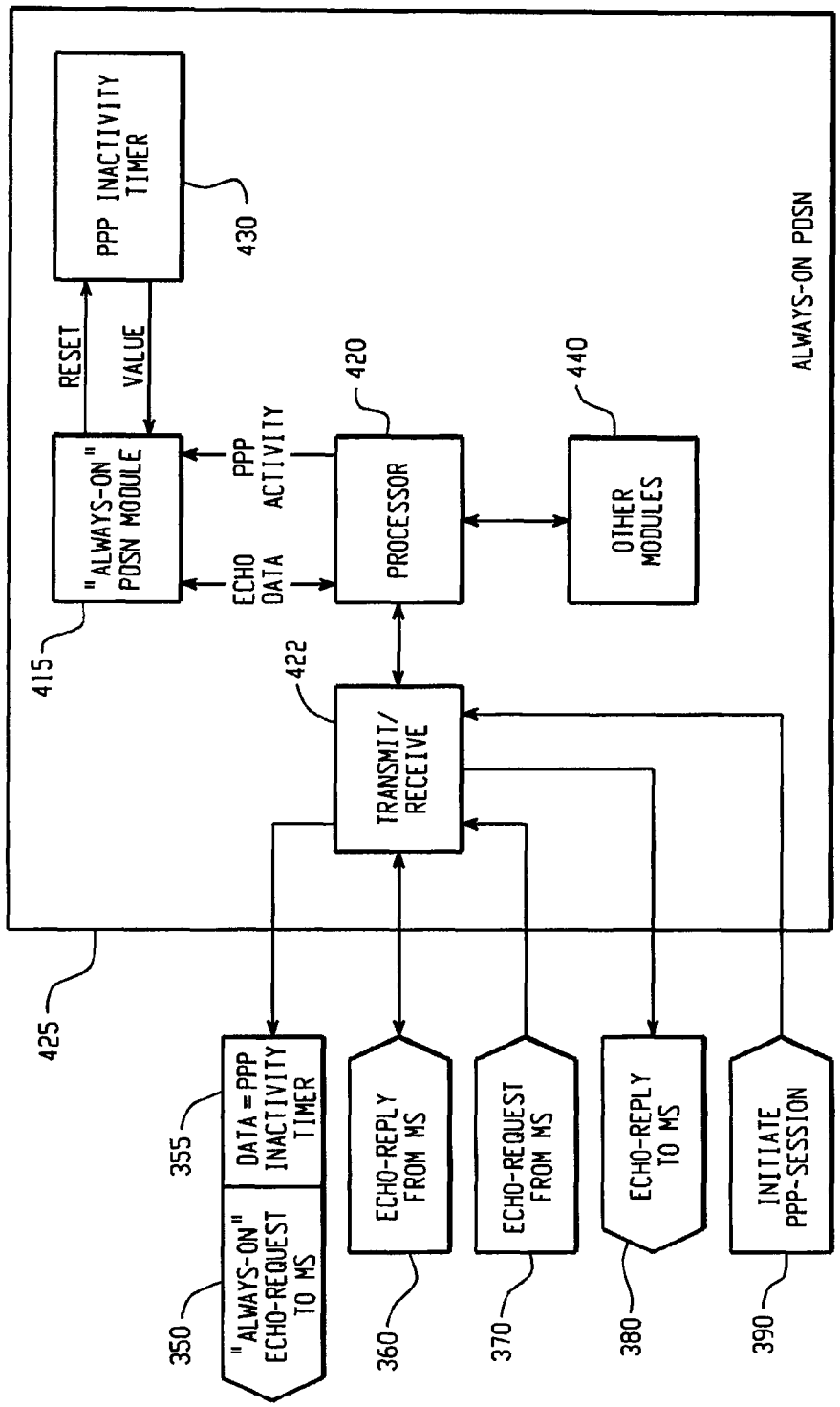
FIG. 4 shows a block diagram of an example always-on PDSN.
Figure 5:
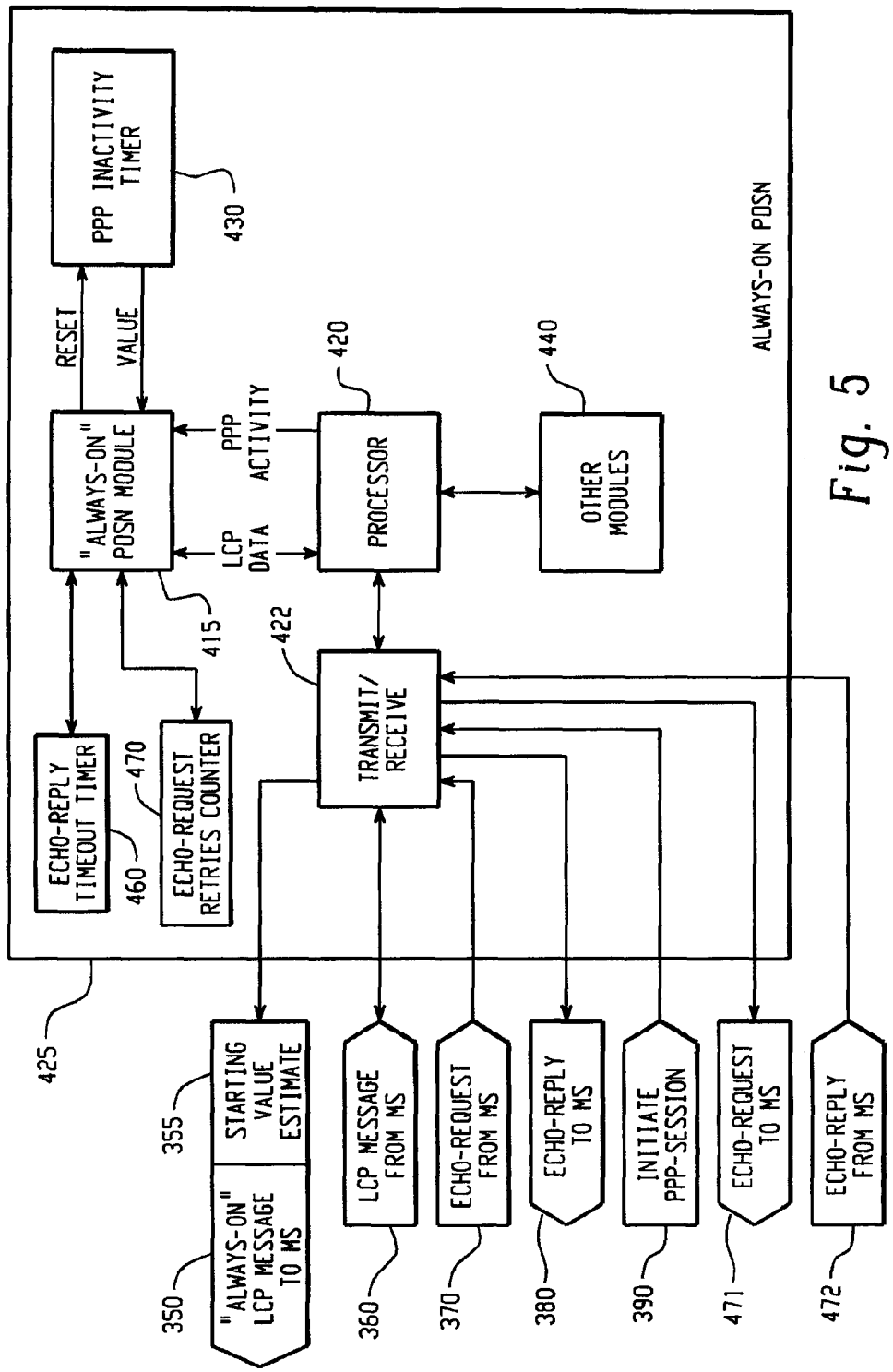
FIG. 5 shows a more-detailed block diagram of the example always-on-PDSN of FIG. 4.

FIG. 3 shows a block diagram of an example always-on mobile station 310, and FIGS. 4 and 5 show block diagrams of an example always-on PDSN 425. Also illustrated in FIGS. 3-5 are example communications 350, 355, 360, 370, 380, 390 between the always-on mobile station 310 and the always-on PDSN 425 that may be used to maintain an always-on PPP session.

With reference first to FIG. 3, the example mobile station (MS) 310 includes an always-on MS module 315, a processor 320, a transceiver 322, an inactivity timer estimate 330, and other mobile station modules 340. The processor 320 may be a microprocessor, a digital signal processor, or some other type of processing device. The transceiver 322 is operable to transmit and receive RF signals, and may include a single transceiver circuit or separate transmitter and receiver circuits.

The always-on MS module 315 may be a software module, a hardware module or a combination of both, and is operable to set and track the inactivity timer estimate 330. The inactivity timer estimate 330 may be a timing device, such as a decrementing counter, that is set by the always-on MS module 315 to estimate the value of an inactivity timer 430 in the always-on PDSN 425 (see FIGS. 4 and 5). The other modules 340 may be software and/or hardware modules typically included in a mobile station 310, such as a display, keyboard, speaker, microphone, etc.

Operationally, when a PPP session 390 is initiated between the mobile station 310 and an always-on PDSN 425, the PDSN 425 transmits a link control protocol (LCP) message 350 to the mobile station 310 that includes a starting value estimate 355, which is generated by the PDSN as a function of the initialization value for the inactivity timer 430 in the PDSN 425. When the mobile station 310 receives the LCP message 350, the starting value estimate 355 is used by the always-on MS module 315 to initialize the inactivity timer estimate 330, and an LCP reply message 360 is transmitted from the mobile station 310 to the always-on PDSN 425.

The value of the inactivity timer estimate 330 affects the operation of the always-on MS module 315, particularly in out-of-coverage situations. That is, an always-on connection with the 
PDSN 425 is maintained so long as the inactivity timer estimate 330 has not expired. During periods of inactivity, the always-on MS module 315 causes the inactivity timer estimate 330 to decrement from the starting value estimate 355. Each time a PPP frame is sent or received by the mobile station 310, the inactivity timer estimate 330 is reset to the starting value estimate 355. To maintain an always-on connection during periods of inactivity, the always-on MS module 315 may send and receive LCP messages or other PPP session communications 350, 360, 370, 380 to and from the always-on PDSN 425. Upon expiration of the inactivity timer estimate 330, the mobile station 310 may initiate a new PPP session 390, or may enter an inactive state. If a new PPP session 390 is initiated by the mobile station 310, then the mobile station 310 may receive a new starting value estimate 355 from the PDSN 425, or may reset the inactivity timer estimate 330 using the starting value estimate 355 from the prior PPP session. The operation of the mobile station 310 is further described below with reference to FIGS. 6-8.

With reference now to FIG. 4, the example always-on PDSN 425 includes an always-on PDSN module 415, a processor 420, a transceiver 422, an inactivity timer 430 and other PDSN modules 440. The processor 420 may be a microprocessor, a digital signal processor, or some other type of processing device. The transceiver 422 may, for example, be a network card that is configured to send and receive data over a wireless link via a radio network (RN) 14, 22. The always-on PDSN module 415 may be a software module, a hardware module, or a combination of both, and is operable to reset and track the inactivity timer 430. The inactivity timer 430 may be a timing device, such as a decrementing counter, and may be used by the always-on PDSN 425 to monitor the amount of time since a PPP frame was sent to or received from the always-on mobile station 310.

Operationally, upon entering the IP control protocol (IPCP) opened state on a PPP session, the PDSN 425 starts the inactivity timer 430, and sends an LCP request message 350 to the mobile station 310 that includes a starting value estimate 355 generated as a function of the starting value of the inactivity timer 430. The starting value estimate 355 is used by the mobile station 310 to estimate the value of the inactivity timer 430, as described above. Then, when the processor 420 in the always-on PDSN 425 detects PPP activity with an always-on MS 310, the always-on PDSN module 415 is notified of the activity and resets the inactivity timer 430 to its starting value. PPP activity which may cause the always-on PDSN module 415 to reset the inactivity timer 430 may, for example, include sending or receiving an LCP request message 350, 370, sending or receiving an LCP reply message 360, receiving an initiate PPP-session 390, or other PPP-session communications with the mobile station 310.

FIG. 5 shows a more-detailed block diagram of the example always-on PDSN 425 that illustrates an Echo-Reply-Timeout timer 460 and an Echo-Request-Retries counter 470, in addition to the components shown in FIG. 4. The Echo-Reply-Timeout timer 460 may be used by the PDSN 425 to track the amount of time since an LCP request message 350 or Echo request message 471 was sent by the PDSN 425 with no response from the mobile station 310. The Echo-Request-Retries counter may record the number of times that the always-on PDSN 425 resends an LCP request message 350 or Echo request message 471 to the mobile station 310 without receiving an LCP reply message 360 in response. It should be understood that the LCP reply message 360 may be a rejection if, for example, the mobile station does not support LCP messages 350, such as may be the case if the LCP message 350 is a vendor specific LCP message.

Upon expiration of the inactivity timer 430, the PDSN 425 may send an Echo-Request message to the mobile station 310 in an attempt to maintain the PPP session by eliciting an Echo-Reply message from the mobile station 310. When an Echo-Request message is sent by the PDSN 425, the Echo-Reply-Timeout timer 460 is started, and the Echo-Request-Retries counter 470 is initialized. If an Echo-Reply message is received from the mobile station 310, then the always-on PDSN 425 may reset the inactivity timers 430, and the PPP session is maintained. Otherwise, if the Echo-Reply-Timeout timer 460 expires and the Echo-Request-Retries counter 470 has not reached a pre-selected cutoff value (e.g., zero), then the always-on PDSN 425 may send another LCP Echo-Request message to the mobile station 310, decrement the Echo-Request-Retries counter 470, and re-start the Echo-Reply-Timeout timer 460. This process may be repeated until an Echo-Reply message or other PPP activity is received from the mobile station 310 or until the Echo-Request-Retries counter value reaches the cutoff value, at which point the always-on PDSN 425 may close the PPP session. The operation of the always-on PDSN 425 is further described below with reference to FIG. 9.

In order to account for the PDSN 425 sending and resending an Echo-Request message upon expiration of the inactivity timer 430, the starting value estimate 355 transmitted to the mobile station 310 may be calculated as follows:

$$SVE = IT + ERT \times (ERR + 1),$$

where SVE is the starting value estimate 355, IT is the starting value of the inactivity timer 430, ERT is the starting value of the Echo-Reply-Timeout timer 430, and ERR is the starting value of the Echo-Request-Retries counter.

It should be understood, however, that other techniques could be used to calculate the starting value estimate 355 to provide an accurate estimate.

Figure 6:
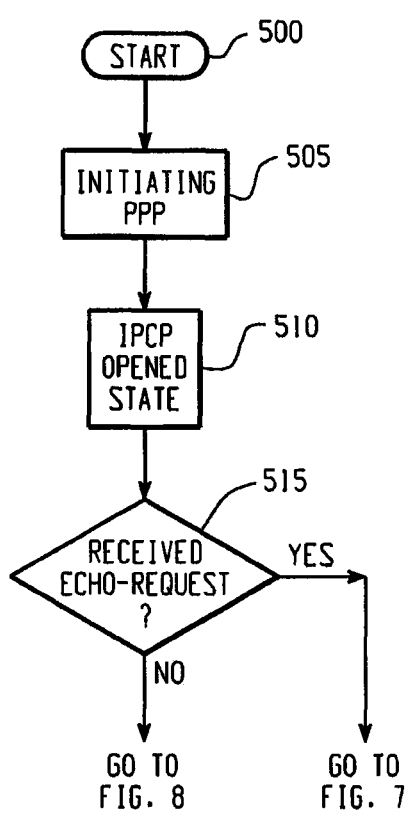
FIG. 6-8 are flow diagrams that illustrate an example operation of an always-on mobile station.
Figure 8:
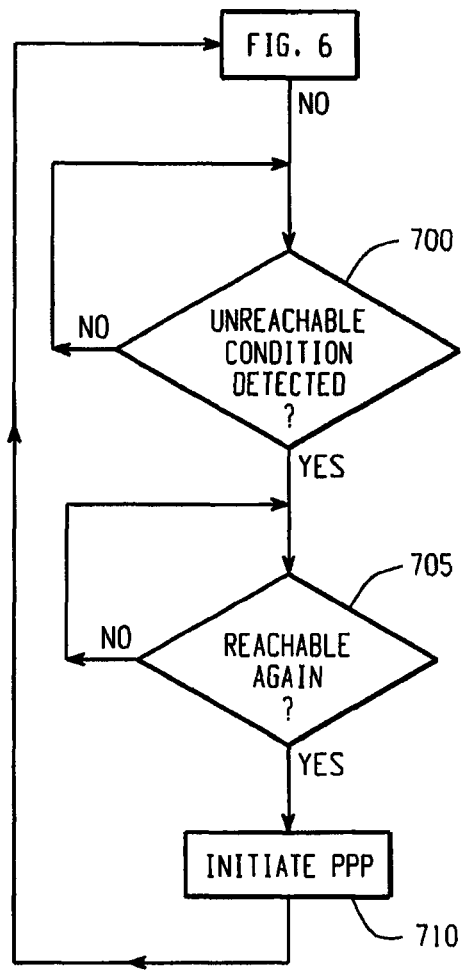
Figure 7:
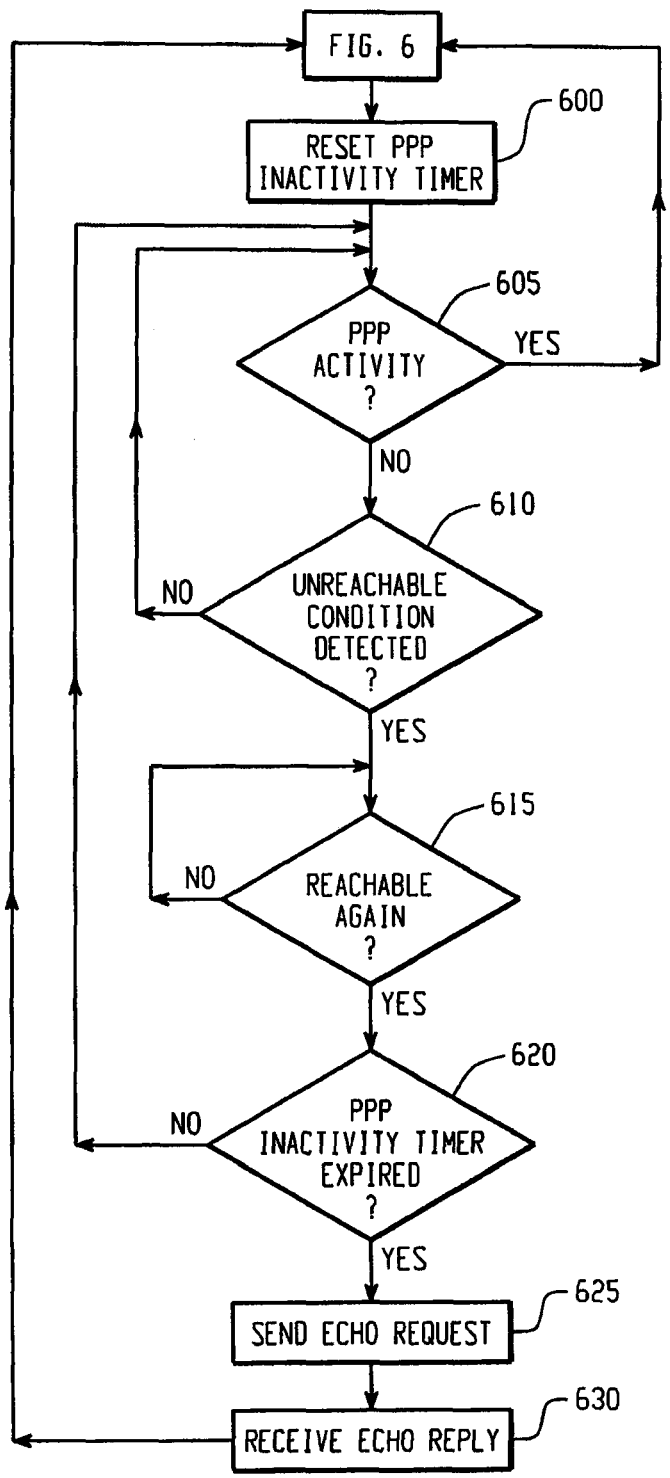

FIG. 6-8 are flow diagrams that illustrate an example operation of an always-on mobile station. With reference first to FIG. 6, the method begins at step 500, which may occur, for example, when an always-on mobile station is powered on. In step 505, the mobile station initiates a PPP session. For example, the mobile station may initiate a call using a packet data service option such as Service Option 33. Further details of the PPP session initiation procedure are available in TIA/EIA/IS-2000-1, TIA/EIA/IS-2000-2, TIA/EIA/IS-2000-3, TIA/EIA/IS-2000-4, TIA/EIA/IS-2000-5, and TIA/EIA/IS-707, which have been incorporated herein by reference. The PDSN may then open a PPP session to the mobile station, causing the mobile station to enter the IP Control Protocol (IPCP) Opened state at step 510.

In step 515, the mobile station determines if it has received a message with a data field, such as an LCP request message from the PDSN that includes a starting value estimate, as described above. It should be understood, however, that the mobile station may receive the starting value estimate in other ways, such as via an A-interface message in a new version of the A-interface sent from the PDSN to the RN and then to the MS via a message defined in a new version of IS-707. In any case, if the expected message is not received by the mobile station within a pre-determined time interval, then the method proceeds to FIG. 8. Otherwise, if a message with the expected data field is received within the pre-determined time interval, then the method continues to FIG. 7.

With reference now to FIG. 7, the method continues from FIG. 6. At step 600, the inactivity timer estimate in the mobile station is reset. For example, if the mobile station had received a starting value estimate of 60 seconds in FIG. 6, then the inactivity timer estimate may be set 60 and decrement once per second such that it would expire at zero. At step 605, the mobile station monitors for PPP activity. If PPP activity is detected, then the method returns to step 600. Otherwise, if no PPP activity is detected, then the method continues to step 610. PPP activity may, for example, be detected by sending or receiving a PPP packet to or from the PDSN.

At decision step 610, the mobile station determines if a condition exists to make the mobile device unreachable by the PDSN. An unreachable condition could, for example, result from losing the paging channel, making a voice telephone call using a service option such as EVRC when the air interface does not support concurrent services, or for other reasons. If there is no condition making the mobile station unreachable, then the method returns to step 605. Otherwise, if there is a condition that makes the mobile station unreachable, then the method continues to step 615.

At decision step 615, the mobile station determines if it has become reachable by the PDSN. This may occur, for example, if the mobile station reacquired the Paging Channel after a loss of the paging channel, ended a voice telephone using a service option such as EVRC, or for other reasons. If the mobile station is not yet reachable, then the method remains at decision step 615. Otherwise, if the mobile station becomes reachable, then the method continues at decision step 620.

At decision step 620, the mobile station determines if the inactivity timer estimate has expired. If the inactivity timer estimate on the mobile station has not expired, then processing continues at step 605. If the inactivity timer estimate has expired, however, then the method continues to step 625. At step 625, the mobile station sends an LCP request message to the PDSN and awaits a reply. Once the mobile station receives an LCP reply from the PDSN in step 630, processing continues at step 600.

Turning now to FIG. 8, the method continues from FIG. 6. At decision step 700, the mobile station determines if a condition exists making the mobile station unreachable by the PDSN, as described above with reference to step 610 in FIG. 7. If there is no condition making the mobile station unreachable, then the method remains at step 700, and the mobile station continues normal operation. Otherwise, if there is a condition that makes the mobile station unreachable, then processing continues at step 705. At decision step 705, the mobile station determines if it is again reachable by the PDSN. For example, the mobile station may become reachable if it reacquires the Paging Channel, ends a voice telephone communication using a service option such as EVRC, or for other reasons. If the result of decision step 705 is that the mobile station is not yet reachable, then processing remains at decision step 705. If the result of decision step 705 is that the mobile station has become reachable, however, then the mobile station initiates a PPP session at step 710, and the method repeats.

Figure 9:
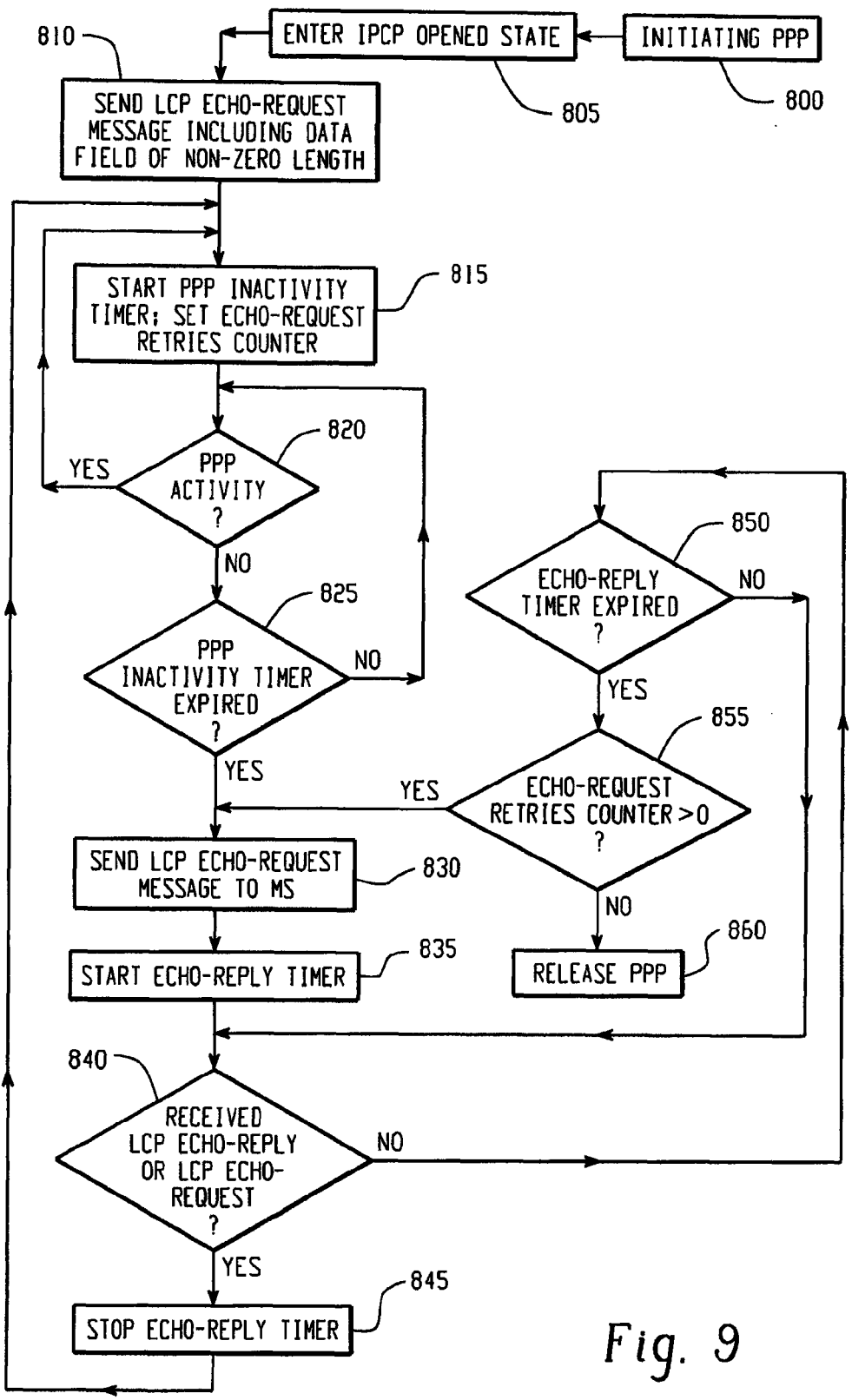
FIG. 9 is a flow diagram illustrating an example operation of an always-on PDSN.

FIG. 9 is a flow diagram illustrating an example operation of an always-on PDSN. The method begins in step 800 when the PDSN initiates a PPP session with a mobile station. At step 805, the PDSN enters the IPCP Opened state, and processing continues at step 810. At step 810, the PDSN sends an LCP message, such as an Echo-Request message, including a data field of non-zero length that includes the starting value estimate, as described above. Then, at step 815 the PDSN starts (or resets) the inactivity timer. For example, if a value of 60 seconds is used for the starting value of the inactivity timer, then the PDSN may set the inactivity timer to 60 and decrement the timer once per second such that it expires at zero.

Once the inactivity timer has been set, the method monitors for PPP activity at step 820. If PPP activity is detected, then the method returns to step 815. Otherwise, if no PPP activity is detected, then the method continues to step 825. PPP activity may, for example, be detected by sending or receiving a PPP packet to or from the mobile station. At decision step 825, the PDSN determines if the inactivity timer has expired. If the inactivity timer has expired, then the method returns to step 820. Otherwise, the method continues to step 830.

At step 830, the PDSN sends an LCP message, such as an Echo-Request message, to the mobile station. Then, at step 835, the PDSN starts an Echo-Reply-Timeout timer and decrements an Echo-Request-Retries counter by one. At step 840, the PDSN monitors for an LCP Echo-Reply message, an LCP Echo-Request message, or any other PPP data from the mobile station. If a PPP message is received at step 840, then the Echo-Reply-Timeout timer is stopped at step 845, and the method returns to step 815. Otherwise, if no PPP message is received at step 840, then the method continues to step 850.

At decision step 850, the PDSN determines if the Echo-Reply-Timeout timer has expired. If not, then the method returns to step 840. If the Echo-Reply-Timeout timer has expired, however, then the method continues to step 855. At decision step 855, the PDSN determines if the Echo-Request-Retries counter is greater than zero. If the counter is greater than zero, then the method returns to step 830. Otherwise, if the Echo-Request-Retries counter is not greater than zero, then the PPP session is released at step 860, and the method ends.

This written description uses examples to disclose the invention, including the best mode, and also to enable a person skilled in the art to make and use the invention. The patentable scope of the invention may include other examples that occur to those skilled in the art. For example, in one embodiment an always-on APN may include an always-on radio network (RN) that cooperates with the always-on PDSN and always-on mobile station to treat voice communications as PPP activity. The always-on PDSN may determine from the always-on RN that the always-on mobile station is currently in a voice call, and therefore that the mobile station is unreachable for the purposes of PPP communication. In this case, the always-on PDSN may treat the always-on mobile station as if it were active for the purposes of PPP.

The invention claimed is:

1. A method in a packet data serving node (PDSN) of a wireless network, the method comprising:
   entering a packet data session over a wireless communication link with a mobile station;
   starting an inactivity timer for the packet data session;
   sending a message to the mobile station, the message comprising a starting value estimate based on a starting value of the inactivity timer;
   monitoring the wireless communication link for packets; and
   if a packet is detected, then resetting the inactivity timer.

2. The method of claim 1, wherein entering the packet data session includes entering a point-to-point protocol ("PPP") session.

3. The method of claim 2, wherein entering the packet data session includes entering an Internet Protocol control protocol ("IPCP") opened state on the PPP session.

4. The method of claim 2, wherein the inactivity timer is a PPP inactivity timer.

5. The method of claim 1, wherein sending the message comprising the starting value estimate comprises:
   calculating the starting value estimate based upon at least the starting value of the inactivity timer; and
   wherein sending the message to the mobile station comprises sending a link control protocol ("LCP") message including the starting value estimate.

6. The method of claim 1, further comprising:
   if the inactivity timer reaches a pre-determined value, then transmitting a link control protocol ("LCP") Echo-Request message.

7. The method of claim 6, further comprising:
   if the inactivity timer reaches the pre-determined value, then starting an Echo-Reply-Timeout timer.

8. The method of claim 7, further comprising:
   if the inactivity timer reaches the pre-determined value, then initializing an Echo-Request-Retries counter.

9. The method of claim 8, further comprising:
   monitoring for an Echo-Reply message;
   if an Echo-Reply message is detected, then resetting each of the Echo-Reply-Timeout timer, the Echo-Request-Retries counter and the inactivity timer;

if the Echo-Reply-Timeout timer reaches a selected value, then incrementing or decrementing the Echo-Request-Retries counter and transmitting an additional LCP Echo-Request message; and if the Echo-Request-Retries counter is incremented or decremented to a set value and the Echo-Reply-Timeout timer reaches the selected value, then closing the packet data session.

10. The method of claim 7, further comprising:
receiving at least one data packet for the packet data session,
stopping the Echo-Reply Timeout timer; and
resetting each of the Echo-Reply Timeout timer, the Echo-Request-Retries counter, and the inactivity timer.

11. A packet data serving node of a wireless network, the packet data serving node comprising:
a transceiver for sending and receiving data between the wireless network and a mobile station;
an inactivity timer to monitor the amount of time since a data packet was sent to or received from the mobile station; and
a module to reset and track the inactivity timer, wherein the module is configured to
start the inactivity timer upon entering a packet data session over a wireless communication link between the wireless network and the mobile station;
send a message to the mobile station, the message comprising a starting value estimate based on a starting value of the inactivity timer;
monitor the wireless communication link for packets; and
reset the inactivity timer if a packet is detected.

12. The packet data serving node of claim 11, wherein the module is further configured to:
transmit a link control protocol ("LCP") Echo-Request message if the inactivity timer reaches a pre-determined value.

13. The packet data serving node of claim 12, further comprising:
an Echo-Reply-Timeout timer; and
wherein the module is further configured to:
start the Echo-Reply-Timeout timer if the inactivity timer reaches the pre-determined value.

14. The packet data serving node of claim 13, further comprising:
an Echo-Request-Retries counter; and
wherein the module is further configured to:
initialize the Echo-Request-Retries counter if the inactivity timer reaches the pre-determined value.

15. The packet data serving node of claim 14, wherein the module is further configured to:
monitor for an Echo-Reply message;
if an Echo-Reply message is detected, then reset each of the Echo-Reply-Timeout timer, the Echo-Request-Retries counter and the inactivity timer;
if the Echo-Reply-Timeout timer reaches a selected value, then incrementing or decrementing the Echo-Request-Retries counter and transmit an additional LCP Echo-Request message; and
if the Echo-Request-Retries counter is incremented or decremented to a set value and the Echo-Reply-Timeout timer reaches the selected value, then close the packet data session.

16. A method in a mobile station, the method comprising:
establishing a packet data session over a wireless communication link with a wireless network;
receiving a message from a packet data serving node (PDSN) of the wireless network, the message comprising a starting value estimate;
setting an inactivity timer estimate at the mobile station to the starting value estimate; and
responsive to detecting a packet over the wireless communication link, resetting the inactivity timer estimate.

17. The method of claim 16, further comprising:
if the inactivity timer estimate reaches a pre-selected value, then establishing a new packet data connection or causing the mobile station to enter an inactive state.

18. The method of claim 16, further comprising:
if the inactivity timer estimate reaches a pre-selected value, then establishing a new wireless communication link.

19. The method of claim 18, wherein the wireless communication link is a point-to-point protocol ("PPP") session.

20. The method of claim 19, wherein receiving the message comprises a link control protocol ("LCP") message.

21. The method of claim 16, further comprising:
if the inactivity timer estimate reaches a pre-selected value, then causing the mobile station to enter an inactive state.

22. A mobile station comprising:
an inactivity timer estimate module to estimate a value of an inactivity timer of a packet data serving node (PDSN) in a wireless network;
a transceiver configured to receive a message from the wireless network upon establishing a packet data session over a wireless communication link between the mobile station and the wireless network, the message comprising a starting value estimate; and
a module coupled to the inactivity timer estimate module and to the transceiver, wherein the module is configured to
set the inactivity timer estimate module to the starting value estimate; and
reset the inactivity timer estimate module to the starting value estimate when the mobile station communicates over the wireless communication link.

23. The mobile station of claim 22, wherein the starting value estimate is a maximum value and wherein the mobile station decrements the inactivity timer estimate module from the maximum value when there is no data activity on the wireless communication link.

24. The mobile station of claim 23, wherein the wireless communication link is maintained until the inactivity timer estimate module is decremented to a pre-selected value.

25. The mobile station of claim 22, wherein the mobile station is further configured to enter an inactive state if the inactivity timer estimate module reaches a preselected value.

26. The mobile station of claim 22, wherein the mobile station is further configured to establish a new wireless communication link if the inactivity timer estimate module reaches a preselected value.

27. The mobile station of claim 22, wherein the module is further configured to reset the inactivity timer estimate module in response to the mobile station successfully sending packet to the wireless network.

28. The mobile station of claim 22, wherein the module is further configured to reset the inactivity timer estimate module to the starting value estimate in response to the mobile station receiving message packet from the wireless network.

29. The mobile station of claim 22, wherein the message comprises a link control protocol ("LCP") message received by the transceiver.

* * * * *